United States Patent
Hao et al.

(10) Patent No.: US 10,863,554 B2
(45) Date of Patent: Dec. 8, 2020

(54) SIGNAL SENDING METHOD AND APPARATUS, AND RESOURCE NOTIFICATION METHOD AND APPARATUS

(71) Applicant: ZTE Corporation, Shenzhen (CN)

(72) Inventors: Peng Hao, Guangdong (CN); Junfeng Zhang, Guangdong (CN); Jian Li, Guangdong (CN); Qiaofeng Wang, Guangdong (CN); Xing Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/127,220

(22) Filed: Sep. 10, 2018

(65) Prior Publication Data
US 2019/0200384 A1    Jun. 27, 2019

Related U.S. Application Data

(63) Continuation of application No. PCT/CN2017/076164, filed on Mar. 9, 2017.

(30) Foreign Application Priority Data

Mar. 18, 2016   (CN) .......................... 2016 1 0161725

(51) Int. Cl.
*H04W 74/08*   (2009.01)
*H04W 74/00*   (2009.01)
(Continued)

(52) U.S. Cl.
CPC ......... *H04W 74/085* (2013.01); *H04L 5/0044* (2013.01); *H04L 5/0048* (2013.01);
(Continued)

(58) Field of Classification Search
CPC . H04W 74/085; H04W 56/001; H04W 74/00; H04W 74/02; H04W 74/08; H04L 5/0044; H04L 5/0048; H04L 25/0226
See application file for complete search history.

(56) References Cited

U.S. PATENT DOCUMENTS

2002/0089957 A1    7/2002  Viero
2010/0020786 A1*   1/2010  Futaki ............... H04W 56/0055
                                                 370/350
(Continued)

FOREIGN PATENT DOCUMENTS

CN       1357212 A    7/2002
CN     101227727 A    7/2008
(Continued)

OTHER PUBLICATIONS

International Search Report and Written Opinion dated Jun. 7, 2017 for International Patent Application No. PCT/CN2017/076164, filed on Mar. 9, 2017 (15 pages).
(Continued)

*Primary Examiner* — Jenee Holland
(74) *Attorney, Agent, or Firm* — Perkins Coie LLP

(57) ABSTRACT

Provided are a signal transmitting method and apparatus, and a resource notification method and apparatus. The signal transmitting method includes: transmitting one or more random access signals. A tail end of the one or more random access signals is aligned with a t−Δt position of a signal transmission region in transmission resources of the one or more random access signals, t is a tail end time point of the signal transmission region and Δt is an advance. Alternatively, a transmitting start time point of the one or more random access signals is a result obtained by subtracting the length of the one or more random access signals and the
(Continued)

advance from the tail end time point of the signal transmission region in the transmission resources.

18 Claims, 8 Drawing Sheets

(51) Int. Cl.
    *H04L 5/00*     (2006.01)
    *H04L 25/02*     (2006.01)
    *H04W 56/00*     (2009.01)
    *H04W 74/02*     (2009.01)

(52) U.S. Cl.
    CPC ....... *H04L 25/0226* (2013.01); *H04W 56/001* (2013.01); *H04W 74/00* (2013.01); *H04W 74/02* (2013.01); *H04W 74/08* (2013.01)

(56) References Cited

U.S. PATENT DOCUMENTS

| | | | | |
|---|---|---|---|---|
| 2010/0178933 | A1* | 7/2010 | Du | H04W 74/08 455/456.1 |
| 2011/0065453 | A1* | 3/2011 | Baldemair | G01S 5/0284 455/456.1 |
| 2011/0096748 | A1* | 4/2011 | Meyer | H04W 74/006 370/329 |
| 2011/0176406 | A1* | 7/2011 | Mauritz | H04J 13/0062 370/208 |
| 2012/0275305 | A1* | 11/2012 | Lin | H04W 74/0841 370/235 |
| 2012/0282889 | A1* | 11/2012 | Tanaka | H04J 11/0053 455/405 |
| 2013/0156018 | A1* | 6/2013 | Kim | H04W 56/003 370/338 |
| 2013/0272220 | A1* | 10/2013 | Li | H04W 72/046 370/329 |
| 2013/0301619 | A1* | 11/2013 | Singh | H04W 56/004 370/336 |
| 2013/0336268 | A1* | 12/2013 | Better | H04W 56/0005 370/329 |
| 2015/0189610 | A1* | 7/2015 | Siomina | G01S 5/021 370/280 |
| 2015/0223124 | A1* | 8/2015 | Wang | H04W 24/08 455/436 |
| 2015/0289292 | A1* | 10/2015 | Sun | H04L 27/2613 370/329 |
| 2015/0373660 | A1* | 12/2015 | Gunnarsson | H04W 56/0045 370/350 |
| 2016/0164657 | A1* | 6/2016 | Fan | H04W 56/001 370/280 |
| 2016/0255537 | A1* | 9/2016 | Uchino | H04W 72/1284 370/329 |
| 2018/0206206 | A1* | 7/2018 | Tie | H04W 68/00 |
| 2019/0274168 | A1* | 9/2019 | Hwang | H04L 27/2602 |

FOREIGN PATENT DOCUMENTS

| | | |
|---|---|---|
| CN | 101472343 A | 7/2009 |
| CN | 102204341 A | 9/2011 |
| CN | 103716895 A | 4/2014 |
| CN | 104184540 A | 12/2014 |
| WO | 2008/037170 A1 | 4/2008 |

OTHER PUBLICATIONS

Extended Search Report dated Dec. 16, 2019 for European Patent Application No. 17765784.8, filed on Mar. 9, 2017 (8 pages).
First Office Action dated Jan. 15, 2020 for Chinese Patent Application No. 201610161725.8, filed on Mar. 18, 2016 (27 pages).
Second Office Action dated Jun. 15, 2020 for Chinese Patent Application No. 201610161725.8, filed on Mar. 18, 2016 (11 pages).

* cited by examiner

SIGNAL SENDING METHOD AND APPARATUS, AND RESOURCE NOTIFICATION METHOD AND APPARATUS

CROSS REFERENCE TO RELATED APPLICATIONS

This patent document is a continuation of and claims priority to International Patent Application No. PCT/CN2017/076164, filed on Mar. 9, 2017, which claims the benefit of priority of Chinese Patent Application No. 201610161725.8, filed on Mar. 18, 2016. The entire content of the before-mentioned patent applications are incorporated by reference as part of the disclosure of this application.

TECHNICAL FIELD

The present application relates to, but is not limited to, the field of wireless communications and, in particular, relates to a signal transmitting method and apparatus and a resource notification method and apparatus.

BACKGROUND

Long Term Evolution (LTE) is a fourth-generation cellular mobile communication system and has been widely put into commercial use. For the cellular mobile communication system, an uplink random access is an unavoidable function, and the uplink random access generally starts in multiple scenarios such as after-startup, uplink out-of-synchronization, service arrival or service switching, to complete an uplink synchronization process.

The uplink synchronization process of a random access channel (RACH) of the LTE radio communication system is as follows. A terminal transmits a preamble on an uplink synchronization channel, and a base station obtains a time advance, with which the terminal transmits signals, by detecting the preamble, and feeds the time advance back to the terminal. On time domain physical resources, the RACH is generally composed of a cyclic prefix (CP), a preamble and a guard time (GT, or in other words, a suffix), as shown in FIG. 1. The length of each portion is relevant to a coverage. An RACH which occupies more time domain resources can support a larger coverage and bring about greater system overhead. In the frequency domain, the bandwidth occupied by the RACH is relevant to a timing precision. A larger bandwidth will bring about a better timing precision and greater overhead. In some technical solutions, the GT is not included in the definition of the RACH channel, which is also feasible. In addition, the RACH may also include no CP, which depends on the multiple access method. For example, the random access preamble in the 3G system has no CP.

Except a special sub-frame, other sub-frames in the LTE are either downlink sub-frames or uplink sub-frames. Therefore, when the base station notifies the terminal of the sub-frame position resource, a random access signal may be certainly sent from the starting position of an uplink sub-frame. In the special sub-frame, a random access signal may be sent on an uplink pilot time slot (UpPTS). Before the terminal transmits the random access signal, the terminal may explicitly obtain specific information in the special sub-frame such as a downlink pilot time slot (DwPTS), a guard period (GP) and a length and position of the UpPTS so that the terminal may uniquely determine the starting point of the random access signal.

In the implementation process of LTE, the entire uplink sub-frame may be sent slightly in advance of an original position to ensure that signals sent by all terminals arrive at the base station substantially at the same time, but this advance is not applicable to a random access. In a Time Division Duplexing (TDD) mode, an additional sending advance may solve the protection time problem of a switching point from the uplink to the downlink and prevent the uplink sub-frame from interfering with the downlink sub-frame. This advance is as small as about 20 ns. In a TDD special sub-frame, the UpPTS is the uplink part of the special sub-frame and may be used for carrying a short random access signal. The starting position of the UpPTS is also completely knowable to the terminal through configuration information. The UpPTS may be sent slightly in advance of the starting position by 20 us for the purpose described above.

Uplink synchronization is generally implemented in two manners, namely, a contention manner and a non-contention manner. The contention manner means that the terminal randomly selects an RACH resource to transmit a random access signal to complete the uplink synchronization. The manner will cause that different terminals select the same RACH resource, and RACH collisions occur. The non-contention manner means that the base station allocates an RACH resource to the terminal and the terminal transmits the random access signal on the corresponding resource.

A new-generation mobile communication system will perform system networking at a carrier frequency higher than those used in 2G, 3G and 4G systems. Frequency bands which are currently widely recognized in the industry and by international organizations are mainly 3 GHz-6 GHz and 6 GHz-100 GHz. These frequency bands substantially belong to a centimeter band or a millimeter band, and the propagation characteristics of these frequency bands are significantly different from those of lower frequency bands. Compared with the symmetric carrier deployment of the Frequency Division Dual (FDD), the channel reciprocity of a TDD system is more favorable in such high frequency bands. Meanwhile, the TDD mode is also helpful to reduce the costs and system overhead of using large-scale antenna arrays. Therefore, it is widely believed in the industry that the TDD will be the most important filed of the new generation mobile communication system. For a future frame structure of the TDD, a typical self-contained TDD sub-frame structure was disclosed at the working conference of the 3GPP 5G workshop in September 2015. As shown in FIG. 2, the sub-frame structure is a basic component unit for describing resources in the future system, a resource allocation unit and a basic scheduling unit (BSU). For convenience of description, the present disclosure still uses the term sub-frame to represent the BSU. A sub-frame includes a downlink region, an uplink region and a guard period. The downlink region includes one or more of downlink control signaling (DL Ctrl), downlink reference signal (RS), and downlink data. The uplink region includes one or more of uplink control signaling (UL Ctrl) and uplink data. The self-feedback refers to the uplink feedback for DL Ctrl and DL data. For example, acknowledgement/non-acknowledgement (ACK/NACK) of Hybrid Automatic Repeat reQuest (HARQ), Channel State Information (CSI), etc. may be fed back in the same sub-frame and do not need to span multiple sub-frames.

The random access signal needs to be sent in the uplink region of the sub-frame because the random access signal is an uplink signal. Generally, the terminal can obtain the index of the sub-frame and frequency position for carrying the RACH before the random access signal is sent. However, the starting position of the uplink region is unknown, because the starting position is related to lengths of the downlink and uplink regions in the self-contained sub-frame, and the lengths of the downlink and uplink regions and resource allocation are dynamically changing. Therefore, how to flexibly determine a transmitting position of the random access signal is a problem to be solved.

SUMMARY

The following is a summary of the subject matter described in detail in the present disclosure. This summary is not intended to limit the scope of the claims.

Embodiments of the present disclosure provide a signal transmitting method and apparatus and a resource notification method and apparatus, which are capable of flexibly determining a transmitting position of a random access signal, thereby saving overhead and decreasing implementation complexity.

According to a first aspect, the embodiments of the present application provide a signal transmitting method, comprising:

transmitting one random access signal or a plurality of random access signals; wherein, a tail end of the one random access signal or the plurality of random access signals is aligned with a t–Δt position of a signal transmission region in transmission resources of the one random access signal or the plurality of random access signals, where t is a time position of the tail end of a signal transmission region and Δt is an advance. Alternatively, a transmission starting time point of the one random access signal or the plurality of random access signals is a result obtained by subtracting a length of the one random access signal or the plurality of random access signals and the advance from the time position of the tail end of the signal transmission region in the transmission resources of the one random access signal or the plurality of random access signals.

In an exemplary embodiment, the transmission resources include one or more of the following resource allocation units: a basic resource allocation unit, a stretched resource allocation unit, a compressed resource allocation unit and a unidirectional resource allocation unit.

In an exemplary embodiment, the advance may be greater than or equal to 0.

In an exemplary embodiment, the advance may be determined according to a signal that needs to avoid the random access signal and the signal that needs to avoid the random access signal may include at least one of a sounding reference signal (SRS) and a demodulation reference signal (DMRS).

In an exemplary embodiment, the advance may be a time difference between a starting time point of the signal that needs to avoid the random access signal and the tail end time point of the signal transmission region.

In an exemplary embodiment, the transmission resources may include the basic resource allocation unit, a portion of which other than uplink and downlink control regions is not only configured to transmit uplink data but also configured to transmit downlink data.

In an exemplary embodiment, the plurality of random access signals are carried in different regions of the transmission resources, and the different regions do not overlap with each other.

In an exemplary embodiment, the regions where the plurality of random access signals are carried are determined according to indexes indicated by a base station.

In an exemplary embodiment, regions with smaller indexes in which random access signals are carried are closer to the tail end time point of the signal transmission region than regions with larger indexes in which random access signals are carried.

In an exemplary embodiment, the transmission resources may be a basic scheduling unit (BSU).

In an exemplary embodiment, the step of transmitting the random access signal is performed before acquiring at least one of relevant information regarding an internal region of the transmission resources and relevant configuration information regarding uplink and downlink resources.

In an exemplary embodiment, the relevant information regarding the internal region of the transmission resources may include one or more of:

a parameter of a downlink region, a parameter of an uplink region, a parameter of a guard period and a transmission direction of a data region, where the parameter comprises one or more of a length, a position or a resource allocation situation.

According to a second aspect, the embodiments of the present application provide a wireless communication method, including: transmitting or receiving a signal on wireless resources. The wireless resources are formed by stretching or compressing a basic resource allocation unit.

The stretching or compressing may include stretching or compressing one or more of an uplink control region, a downlink control region, a data portion and a guard period of the basic resource allocation unit.

The stretching or compressing may be performed in an integral multiple.

According to a third aspect, the embodiments of the present application provide a wireless communication method, including: transmitting or receiving a signal on wireless resources. The wireless resources are a combination of unidirectional resource allocation units, or the wireless resources are a combination of one or more unidirectional resource allocation units and one or more basic resource allocation units.

The unidirectional resource allocation unit may be a resource allocation unit only including an uplink region or a resource allocation unit only including a downlink region.

According to a fourth aspect, the embodiments of the present application provide a resource notification method, including:

determining one or more of the following parameters of random access resources. identifiers of transmission resources for configuring the random access resources, a length of a random access signal, time advances Δt and indexes of the random access resources; and notifying a terminal of the determined parameters of the random access resources.

In an exemplary embodiment, the transmission resources include one or more of the following resource allocation units: a basic resource allocation unit, a stretched resource allocation unit, a compressed resource allocation unit and a unidirectional resource allocation unit.

In an exemplary embodiment, if configured continuous random access resources exceed one resource allocation unit, the determined parameters of the random access resources at least include an identifier of a first resource allocation unit or an identifier of a last resource allocation unit in the configured continuous random access resources.

In an exemplary embodiment, random access resources with smaller indexes are closer to the tail end time point of the signal transmission region in the transmission resources than random access resources with larger indexes, or random access resources with smaller time advances Δt are closer to the tail end time point of the signal transmission region in the transmission resources than random access resources with larger time advances Δt.

In an exemplary embodiment, the determining one or more of the following parameters of the random access resources may include:

determining at least one of values of the time advances Δt and values of the indexes in an ascending order when the parameters of the random access resources comprise at least one of time advances Δt and the indexes.

In an exemplary embodiment, the notifying the terminal of the determined parameters of the random access resources may include:

transmitting the determined parameters of the random access resource to the terminal through a system broadcast, a system message, or a payload of a downlink access signal, or configuring the determined parameters of the random access resource by another higher layer signaling.

In an exemplary embodiment, the time advance Δt may be used for avoiding a collision with a predetermined uplink signal or distinguishing between different random access resource regions.

According to a fifth aspect, the embodiments of the present application provide a signal transmitting method, including:

receiving, by a terminal, a predetermined signal; and transmitting, by the terminal, a random access signal after a predetermined length of time from when the terminal receives the predetermined signal.

In an exemplary embodiment, the predetermined signal may include one or more of a synchronization signal, a physical broadcast channel (PBCH) and an access configuration set signal.

According to a sixth aspect, the embodiments of the present application provide a resource notification method, including:

indicating, in a downlink control signaling region of a first resource allocation unit, whether the first resource allocation unit or a subsequent resource allocation unit is available for transmitting a random access signal; or indicating, in the downlink control signaling region of the first resource allocation unit, a format of the random access signal that the first resource allocation unit or the subsequent resource allocation unit is allowed to transmit; and transmitting the first resource allocation unit.

In an exemplary embodiment, the subsequent resource allocation unit is a kth resource allocation unit after the first resource allocation unit, where k is greater than or equal to 1.

In an exemplary embodiment, the subsequent resource allocation unit includes one or more of the following resource allocation units: a basic resource allocation unit, a stretched resource allocation unit, a compressed resource allocation unit and a unidirectional resource allocation unit.

In an exemplary embodiment, the stretched resource allocation unit is formed by stretching the basic resource allocation unit and the compressed resource allocation unit is formed by compressing the basic resource allocation unit; and the stretching or compressing may include stretching or compressing one or more of an uplink control region, a downlink control region, a data portion and a guard period of the basic resource allocation unit.

In an exemplary embodiment, the stretching or compressing may be performed in an integral multiple.

In an exemplary embodiment, the unidirectional resource allocation unit is a resource allocation unit only including a downlink region or a resource allocation unit only including an uplink region.

According to a seventh aspect, the embodiments of the present application provide a signal transmitting apparatus, disposed in a terminal, including: a transmission module configured to transmit one random access signal or a plurality of random access signals.

The tail end of the one random access signal or the plurality of random access signals is aligned with a t−Δt position of a signal transmission region in transmission resources of the one random access signal or the plurality of random access signals, where t is a tail end time point of the signal transmission region and Δt is an advance. Alternatively, a transmission starting time point of the one random access signal or the plurality of random access signals is a result obtained by subtracting a length of the one random access signal or the plurality of random access signals and the advance from the tail end time point of the signal transmission region in the transmission resources of the one random access signal or the plurality of random access signals.

In an exemplary embodiment, the transmission resources may include one or more of the following resource allocation units: a basic resource allocation unit, a stretched resource allocation unit, a compressed resource allocation unit and a unidirectional resource allocation unit.

In an exemplary embodiment, the advance may be greater than or equal to 0.

In an exemplary embodiment, the advance may be determined according to a signal that needs to avoid the random access signal, and the signal that needs to avoid the random access signal may at least include one of a sounding reference signal (SRS) and a de modulation reference signal (DMRS).

In an exemplary embodiment, the advance may be a time difference between a starting time point of the signal that needs to avoid the random access signal and the tail end time point of the signal transmission region.

In an exemplary embodiment, the transmission resources include the basic resource allocation unit, a portion of which other than uplink and downlink control regions is not only configured to transmit uplink data but also configured to transmit downlink data.

In an exemplary embodiment, the plurality of random access signals are carried in different regions of the transmission resources, and the different regions do not overlap with each other.

In an exemplary embodiment, the signal transmitting apparatus may further include: a processing module, configured to determine the regions where the plurality of random access signals are carried according to indexes indicated by a base station.

In an exemplary embodiment, regions with smaller indexes in which random access signals are carried are closer to the tail end time point of the signal transmission region than regions with larger indexes in which random access signals are carried.

In an exemplary embodiment, the transmission resources may be a basic scheduling unit (BSU).

In an exemplary embodiment, the signal transmitting apparatus may further include: an acquisition module. The transmission module is configured to transmit the one random access signal or the plurality of random access signals before the acquisition module acquires at least one of relevant information regarding an internal region of the transmission resources and relevant configuration information regarding uplink and downlink resources.

In an exemplary embodiment, the relevant information regarding the internal region of the transmission resources may include one or more of:

a parameter of a downlink region, a parameter of an uplink region, a parameter of a guard period and a transmission direction of a data region, where the parameter comprises one or more of a length, a position or a resource allocation situation.

According to an eighth aspect, the embodiments of the present application provide a wireless communication apparatus, including:

a transmission module, configured to transmit or receive a signal on wireless resources. The wireless resources are formed by stretching or compressing a basic resource allocation unit, or the wireless resources are a combination of unidirectional resource allocation units, or the wireless resources are a combination of one or more unidirectional resource allocation units and one or more basic resource allocation units.

The stretching or compressing may include stretching or compressing one or more of an uplink control region, a downlink control region, a data portion and a guard period of the basic resource allocation unit.

The stretching or compressing may be performed in an integral multiple.

The unidirectional resource allocation unit may be a resource allocation unit only including an uplink region or a resource allocation unit only including a downlink region.

According to a ninth aspect, the embodiments of the present application provide a resource notification apparatus, disposed in a base station, including:

a determination module, configured to determine one or more of the following parameters of random access resources: identifiers of transmission resources for configuring the random access resources, a length of a random access signal, time advances Δt, and indexes of the random access resources; and a notification module, configured to notify the terminal of the determined parameters of the random access resources.

In an exemplary embodiment, the transmission resources may include one or more of: a basic resource allocation unit, a stretched resource allocation unit, a compressed resource allocation unit and a unidirectional resource allocation unit.

In an exemplary embodiment, if configured continuous random access resources exceed one resource allocation unit, the parameters of the random access resources determined by the determination module at least include an identifier of a first resource allocation unit or an identifier of a last resource allocation unit in the configured continuous random access resources.

In an exemplary embodiment, random access resources with smaller indexes are closer to the tail end time point of the signal transmission region in the transmission resources than random access resources with larger indexes, or wherein random access resources with smaller time advances Δt are closer to the tail end time point of the signal transmission region in the transmission resources than random access resources with larger time advances Δt.

In an exemplary embodiment, the determination module is configured to determine the one or more of the parameters of random access resources in the following manner:

determining at least one of values of the time advances Δt and values of the indexes in an ascending order when the parameters of the random access resources comprise at least one of the time advances Δt and the indexes.

In an exemplary embodiment, the notification module may be configured to notify the terminal of the determined parameters of the random access resources in the following manner:

transmitting the determined parameters of the random access resources to the terminal through a system broadcast, a system message, or a payload of a downlink access signal, or configuring the determined parameters of the random access resource parameters in another higher layer signaling.

In an exemplary embodiment, the time advance Δt may be used for avoiding a collision with an uplink signal that needs to avoid the random access signal or distinguishing between different random access resource regions.

According to a tenth aspect, the embodiments of the present application provide a signal transmitting apparatus, disposed in a terminal, including:

a reception module, configured to receive a predetermined signal; and a random access signal transmitting module, configured to transmit a random access signal after a predetermined length of time from when the reception module receives the predetermined signal.

In an exemplary embodiment, the predetermined signal may include one or more of a synchronization signal, a physical broadcast channel (PBCH) and an access configuration set signal.

According to an eleventh aspect, the embodiments of the present application provide a resource notification apparatus, disposed in a base station, including:

an indication module, configured to indicate, in a downlink control signaling region of a first resource allocation unit, whether the first resource allocation unit or a subsequent resource allocation unit is available for transmitting a random access signal; or indicate, in the downlink control signaling region of the first resource allocation unit, a format of the random access signal that the first resource allocation unit or the subsequent resource allocation unit is allowed to transmit; and a transmission module, configured to transmit the first resource allocation unit.

In an exemplary embodiment, the subsequent resource allocation unit after the first resource allocation unit is a kth resource allocation unit after the first resource allocation unit, where k is greater than or equal to 1.

In an exemplary embodiment, the subsequent resource allocation unit after the first resource allocation unit includes one or more of: a basic resource allocation unit, a stretched resource allocation unit, a compressed resource allocation unit and a unidirectional resource allocation unit.

In an exemplary embodiment, the stretched resource allocation unit is formed by stretching the basic resource allocation unit and the compressed resource allocation unit is formed by compressing the basic resource allocation unit; and the stretching or compressing the basic resource allocation unit may include stretching or compressing one or more of an uplink control region, a downlink control region, a data portion and a guard period of the basic resource allocation unit.

In an exemplary embodiment, the stretching or compressing may be performed in an integral multiple.

In an exemplary embodiment, the unidirectional resource allocation unit is a resource allocation unit only including an uplink region or a resource allocation unit only including a downlink region.

The embodiments of the present application further provide a computer-readable storage medium configured to store computer-executable instructions that, when being executed by a processor, implement the method according to any one of the first aspect to the sixth aspect.

The random access solution and the resource notification solution according to the embodiments of the present disclosure may ensure a smooth random access, save system overhead and decrease implementation complexity.

Additional features and advantages of the preset disclosure will be set forth in the description which follows, and in part will be obvious from the description, or may be learned by practice of the present application. The purpose and other advantages of the present application can be implemented and obtained through the structure especially indicated in the description, claims and accompanying drawings.

BRIEF DESCRIPTION OF DRAWINGS

The accompanying drawings are provided a further understanding of the technical solutions of the present application, and constitute a part of the description. The drawings and the embodiments of the present application are used to explain the technical solutions of the present application, and do not constitute a limitation on the technical solutions of the present application.

DETAILED DESCRIPTION

The technical solutions of present disclosure will be further described in detail with reference to the accompanying drawings and embodiments.

It should be noted that if not in collision, the embodiments described herein and the various features thereof may be combined with each other, and the combinations fall within the scope of the present disclosure. In addition, although the flowcharts illustrate logical sequences, in some cases, the steps illustrated or described may be executed in an order different from the ones described herein.

Figure 3:
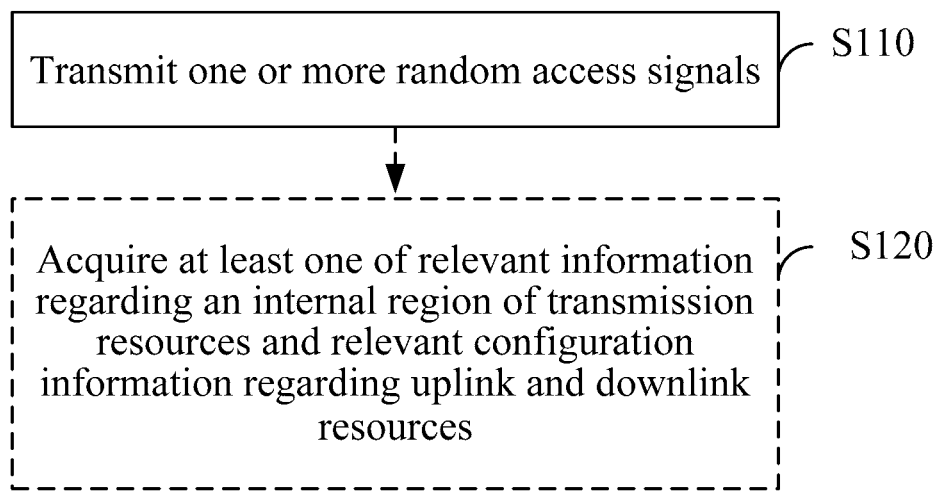
FIG. 3 is a flowchart of a signal transmitting method according to an embodiment 1.

Embodiment 1: provided is a signal transmitting method, which may be applied to a terminal. As shown in FIG. 3, the method includes the step described below.

In S110, one or more random access signals are transmitted. A tail end of the one or more random access signals is aligned with a position $t-\Delta t$ of a signal transmission region in transmission resources of the one or more random access signals, where t is a tail end time point of the signal transmission region and $\Delta t$ is an advance. Alternatively, a transmission starting time point of the one or more random access signals is a result obtained by subtracting a length of the one or more random access signals and the advance from the tail end time point of the signal transmission region in the transmission resources.

The transmission resources may include one of the following resource allocation units or a combination of more of the following resource allocation units: a basic resource allocation unit, a stretched resource allocation unit, a compressed resource allocation unit and a unidirectional resource allocation unit.

In the present embodiment, the tail end of the one or more random access signals is aligned with the position $t-\Delta t$ of the signal transmission region in the transmission resources or the transmission starting time point of the one or more random access signals is calculated by taking the tail end time point of the signal transmission region as a reference point, so the transmitting position of the one or more random access signals is determined according to the tail end of the signal transmission region.

In the present embodiment, in the case of multiple random access signals, the multiple random access signals may be connected end-to-end. The transmission starting time point of the first one of the multiple random access signals may be obtained by subtracting a total length of the multiple random access signals and the advance $\Delta t$ from the tail end time point t of the signal transmission region. The tail end of the last one of the multiple random access signals will be aligned with the position $t-\Delta t$ of the signal transmission region.

In the present embodiment, subtracting the length of the one or more random access signals and the advance $\Delta t$ from the tail end time point of the signal transmission region which is taken as a reference point is equivalent to calculating (backwards the time) the transmission starting position of the random access signals which is before the tail end time point of the signal transmission region by taking the tail end time point of the signal transmission region as the reference point.

In an exemplary implementation of the present embodiment, S110 is executed, that is, the random access signals are transmitted before the terminal acquires at least one of relevant information regarding an internal region of the transmission resources and relevant configuration information regarding uplink and downlink resources (that is, S120).

In this exemplary implementation, the relevant information regarding the internal region of the transmission resources may include one or more of a parameter of a downlink region, a parameter of an uplink region, a parameter of a guard period, a transmission direction of a data region, etc. The parameter may include one or more of a specific length, position, resource allocation situation, etc.

In another exemplary implementation, S120 may be executed before the random access signals are transmitted.

It is to be noted that in the present application, the resource allocation unit may refer to a sub-frame, and correspondingly the basic resource allocation unit is a basic sub-frame, the stretched resource allocation unit is a stretched sub-frame, the compressed resource allocation unit is a compressed sub-frame, and the unidirectional resource allocation unit is a unidirectional sub-frame.

Figure 4:
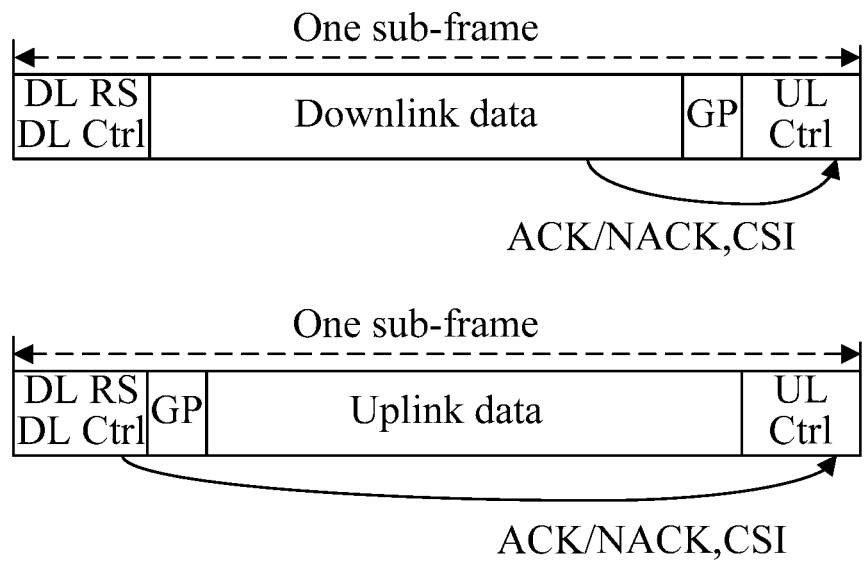
FIG. 4 is a schematic diagram illustrating that downlink data and uplink data in a data region are freely substituted by each other.

As shown in FIG. 4, two sub-frame structures may exist in the system. The main difference between the sub-frame structure in FIG. 2 and that in FIG. 4 is that, in FIG. 4, a central data region may be freely converted between downlink data and uplink data, and such configuration is advantageous for assigning an appropriate sub-frame according to the ratio of uplink service traffics to downlink service traffics. In the TDD mode, a guard period needs to be arranged at a converting point from the downlink to the uplink, so the position of the guard period changes as the data uplink and data downlink are converted to the other. The length of each region within the sub-frame structure may be dynamically, or semi-statically, or statically adjusted. The "uplink region" may also be referred to as a "signal transmission region" and the downlink region may also be referred to as a "signal receiving area". Similarly, for a device that receives an random access channel (RACH), the "uplink region" may also be referred to as a "signal receiving region" and the downlink region may also be referred to as a "signal transmitting area".

In this exemplary implementation, no matter how the length of each region within the sub-frame is adjusted, the terminal may transmit the random access signal before the terminal acquires information of each region such as the length, position, etc.

In an exemplary implementation of the present embodiment, the advance may be greater than or equal to 0.

In this exemplary implementation, the advance may be determined according to a signal that needs to avoid the random access signal. For example, the advance is determined according to a time difference between a starting time point of an uplink signal that needs to avoid the random access signal and a tail end time point of an uplink region. The uplink signal that needs to avoid the random access signal may include, but is not limited to, a sounding reference signal (SRS), a de modulation reference signal (DMRS) and other uplink signals that need to avoid the random access signal.

In an exemplary implementation of the present embodiment, when the sub-frame is an extended sub-frame, the tail end of the uplink region is a tail end of the uplink region of the extended sub-frame.

In this exemplary implementation, the extended sub-frame may be a sub-frame formed by stretching or compressing a basic sub-frame.

The stretching or compressing may be performed on one or more of an uplink control region, a downlink control region, a data portion and a guard period. For example, only the total length of the sub-frame is stretched or compressed, and the length of the control region and the length of the guard period remain unchanged.

In this exemplary implementation, the stretching or compressing may be performed in an integral multiple.

Figure 1:
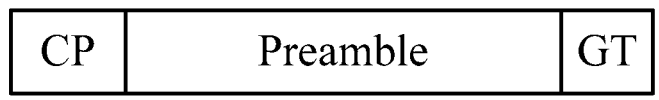
FIG. 1 is a schematic diagram of a random access channel.
Figure 2:
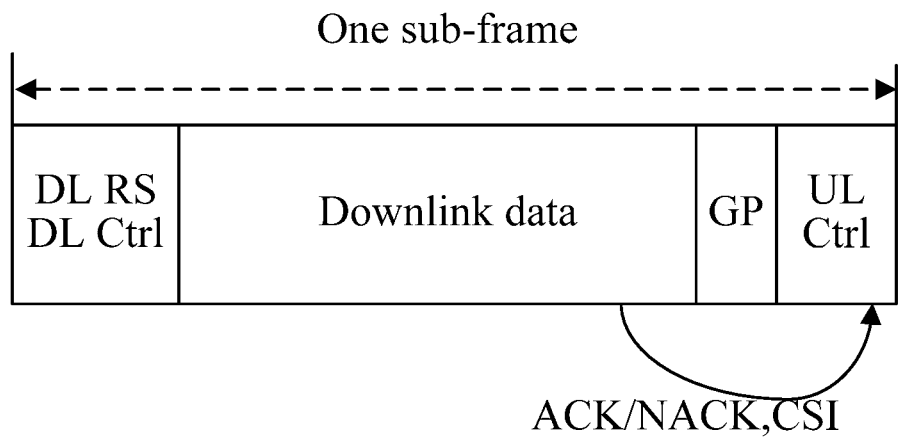
FIG. 2 is a diagram of a structure of a self-contained TDD sub-frame.
Figure 5A:
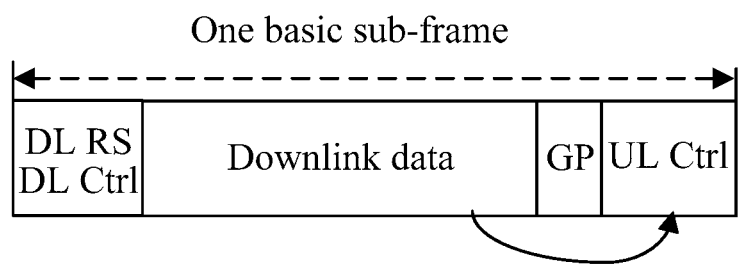
FIGS. 5A-5C are schematic diagrams of structures of extended sub-frames obtained by flexibly stretching.
Figure 5B:
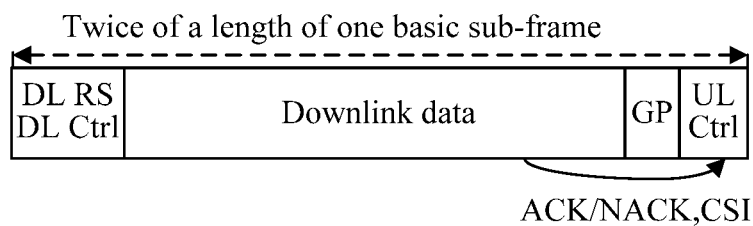
Figure 5C:
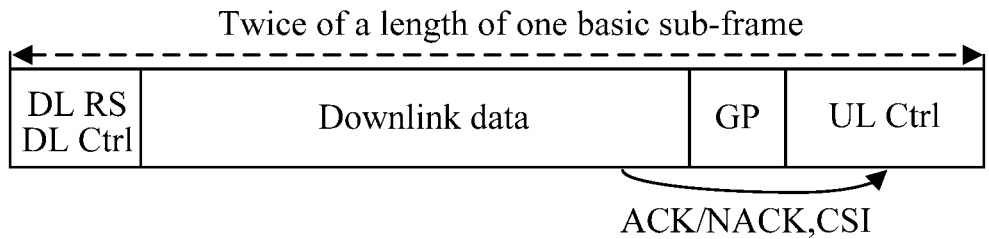

FIGS. 5a-5c illustrate new sub-frames formed by flexibility stretching the basic sub-frame illustrated in FIG. 2. The stretching of the sub-frame is constrained by a proportional extension principle in the time length. For example, if the length of an original basic sub-frame is 0.2 ms, the length of the extended sub-frame is 0.4 ms or greater. The lengths of the uplink control region, the downlink control region and the guard period within the extended sub-frame may remain consistent with those of the basic sub-frame or be stretched proportionally on the basic sub-frame. FIG. 5a shows the basic sub-frame, and FIGS. 5b and 5c are two possible implementations. As shown in FIG. 5b, in the first possible implementation, only the total length of the sub-frame is stretched. As shown in FIG. 5c, in the second possible implementation, the control region and the guard period are also stretched. Given the total length is stretched, stretching of others internal parts, such as stretching the GP, stretching the downlink control region and stretching the uplink control region may be combined with each other. The stretching of the internal parts does not necessarily need to be constrained by the proportional extension principle. In this extended sub-frame structure, the downlink data and the uplink data may be freely converted to each other, which is similar to the sub-frame structure shown in FIG. 4. Since the total length is extended proportionally, the extended sub-frame and the basic sub-frame are easy to coexist in the system. It should be noted here that a manner in which a longer sub-frame is taken as a basic sub-frame and a flexibly compressed sub-frame is taken as an extended sub-frame also complies with the principle of stretching or compressing proportionally, so the sub-frame structure in this manner is also protected by the present embodiment.

In an exemplary implementation of the present embodiment, the transmission resources may be a combination of unidirectional sub-frames or a combination of one or more unidirectional sub-frames and one or more basic sub-frames.

In this exemplary implementation, the unidirectional sub-frame may be a sub-frame in which only a single downlink region exists or a sub-frame in which only a single uplink region exists. That is, the unidirectional sub-frame may be a sub-frame only including an uplink region or a sub-frame only including a downlink region.

Figure 6:
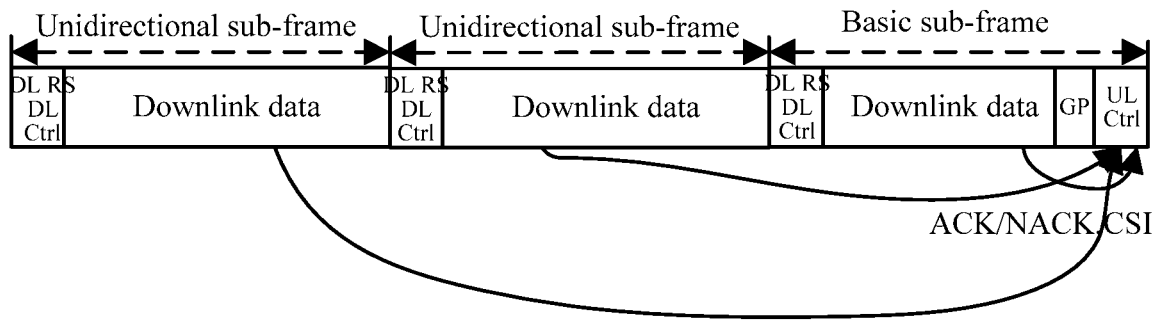
FIG. 6 is a schematic diagram of a combination of unidirectional sub-frames and a basic sub-frame.

FIG. 6 is a schematic view of a combination of sub-frames. The basic sub-frame is varied in a way that it does not contain a certain type of control region, forming a single downlink sub-frame or uplink sub-frame. This sub-frame may be referred to as a unidirectional sub-frame. The unidirectional sub-frame may be combined with at least one basic sub-frame of the same type. A typical example is described below. In a scenario with large downlink traffic, the uplink control regions in one or more basic sub-frames are substituted by downlink data, and guard periods are provided, and consequently downlink unidirectional sub-frames are formed, and the downlink unidirectional sub-frames are combined with one or more basic sub-frames. The uplink feedback signaling formed by combining multiple downlink unidirectional sub-frames and a basic sub-frame is carried by the uplink control region of the basic sub-frame. The combination may be flexible and not limited to the typical example. For example, multiple uplink unidirectional sub-frames may be combined with a basic sub-frame, and the downlink physical layer control signaling required by the multiple uplink unidirectional sub-frames is carried by the downlink control portion of the basic sub-frame.

In an exemplary implementation of the present embodiment, the transmission resources may include a basic sub-frame. A portion other than uplink and downlink control regions may be not only used for transmitting uplink data but also used for transmitting downlink data.

In an exemplary implementation of the present embodiment, the multiple random access signals may be sent in regions, and the regions do not overlap each other.

In this exemplary implementation, the multiple random access signals are transmitted in the signal transmission region of the transmission resources in a non-contention random access manner.

In an implementation example of this exemplary implementation, the regions where the multiple random access signals are carried may be determined according to indexes indicated by a base station.

In another implementation, the regions where the multiple random access signals exist may also be determined according to advances Δt of different lengths.

In this implementation, random access signal resources whose indexes are smaller are closer to the tail end of the uplink region, and random access signal resources whose indexes are larger are farther from the tail end of the uplink region.

The base station may firstly arrange the terminal to transmit signals on the resources with smaller index, and then gradually increase the index of resources to be used by the terminal to transmit signals.

In an exemplary implementation of the present embodiment, the transmission resources may be a self-contained sub-frame structure as shown in FIG. 2, and various sub-frame structures may be appropriately derived according to different requirements and scenarios. This sub-frame structure is a basic component for describing resources, also a resource allocation unit, and more a basic scheduling unit (BSU).

Due to diverse requirements, basic sub-frames and various extended sub-frames and possible combinations thereof exist in one system, resulting in a more complicated new system, and also increasing difficulties for a terminal which acquires a little initial information to initiate a random access. The random access solution provided in the present embodiment may ensure a smooth random access, save system overhead, and decrease implementation complexity.

Figure 7:
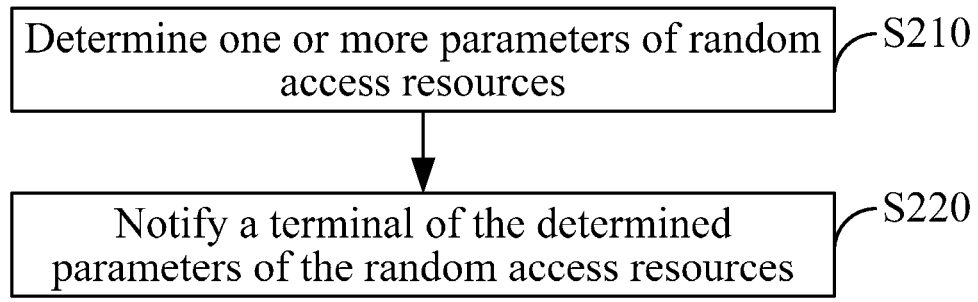
FIG. 7 is a flowchart of a resource notification method according to an embodiment 2.

Embodiment 2 provides a resource notification method, which may be applied to a base station or another network device. As shown in FIG. 7, the method includes steps S210 and S220.

In S210, one or more of the following parameters of the random access resources are determined: identifiers of transmission resources for configuring the random access resources, a length of a random access signal, time advances Δt and indexes of random access resources.

In S220, a terminal is notified of the determined parameters of the random access resources.

In the present embodiment, the parameters of the random access resources further include a format of the random access signal.

In the present embodiment, the transmission resources may include one or more of the following resource allocation units: a basic resource allocation unit, a stretched resource allocation unit, a compressed resource allocation unit and a unidirectional resource allocation unit.

In an exemplary implementation of the present embodiment, if the configured continuous random access resources exceed one resource allocation unit, the determined parameters of the random access resources may at least include an identifier of the first resource allocation unit or an identifier of the last resource allocation unit in the configured continuous random access resources. That is, the terminal is notified of the first or the last resource allocation unit.

In an exemplary implementation of the present embodiment, the random access signal resources having smaller indexes or advances Δt are closer to a tail end of a signal transmission region in the transmission resources; the random access signal resources having larger indexes or advances Δt are farther from the tail end of the signal transmission region in the transmission resources.

In this exemplary implementation, when the parameters of the random access resource include at least one of the time advance Δt and the index, at least one of values of the time advances Δt and values of the indexes may be determined in an ascending order. It is equivalent to that the base station firstly arranges the terminal to transmit signals on random access resources with small indexes or time advances, and then gradually increases the index or the time advance.

In an exemplary implementation of the present embodiment, the step of notifying the terminal of the determined parameters of the random access resources is described below.

The determined parameters of the random access resources are transmitted to the terminal through a system broadcast, a system message, or a payload of a downlink access signal, or may be configured in another higher layer signaling.

In an exemplary implementation of the present embodiment, the time advance Δt may be used for avoiding a collision with a specific uplink signal or distinguishing between different random access resource regions.

Figure 8:
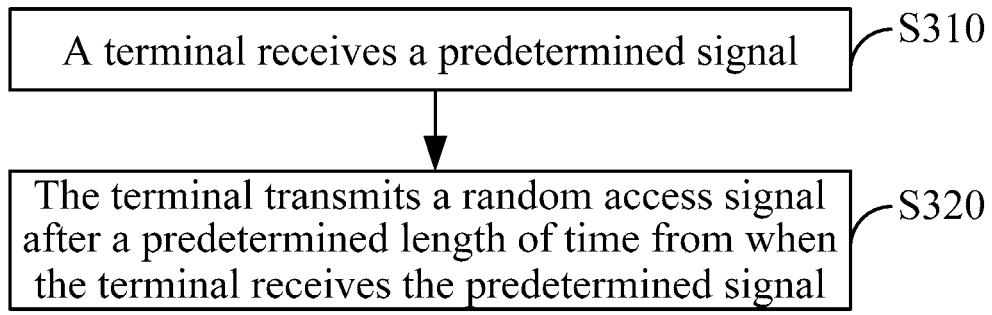
FIG. 8 is a flowchart of a signal transmitting method according to an embodiment 3.

Embodiment 3 provides a signal transmitting method, which may be applied to a terminal. As shown in FIG. 8, the method includes steps S310 and S320.

In S310, a terminal receives a predetermined signal.

In S320, the terminal transmits a random access signal after a predetermined length of time from when the terminal receives the predetermined signal.

In an exemplary implementation of the present embodiment, the predetermined signal may be any one of a synchronization signal, a physical broadcast channel (PBCH) and an access configuration set signal and the like.

Figure 9:
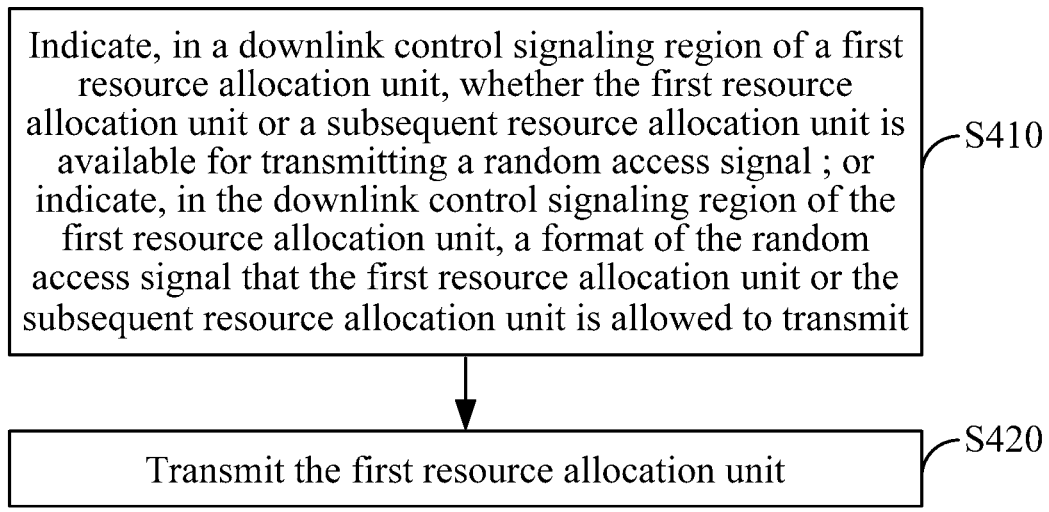
FIG. 9 is a flowchart of a resource notification method according to an embodiment 4.

Embodiment 4 provides a resource notification method, which may be applied to a base station. As shown in FIG. 9, the method includes steps S410 and S420.

In S410, in a downlink control signaling region of a first resource allocation unit, whether the first resource allocation unit or a subsequent resource allocation unit is available for transmitting a random access signal is indicated; or the format of the random access signal that the first resource allocation unit or the subsequent resource allocation unit is allowed to transmit is indicated, that is, which format of the random access signal is allowed to be sent, is indicated.

In S420, the first resource allocation unit is transmitted.

In an exemplary implementation of the present embodiment, the subsequent resource allocation unit after the first resource allocation unit refers to a kth resource allocation unit after the first resource allocation unit, where k is greater than or equal to 1.

In this exemplary implementation, the subsequent resource allocation unit after the first resource allocation unit may include one or more of the following resource allocation units: a basic resource allocation unit, a stretched resource allocation unit, a compressed resource allocation unit and a unidirectional resource allocation unit.

The stretched resource allocation unit is formed by stretching the basic resource allocation unit and the compressed resource allocation unit is formed by compressing the basic resource allocation unit. The stretching or compressing may include stretching or compressing one or more of an uplink control region, a downlink control region, a data portion and a guard period of the basic resource allocation unit.

The stretching or compressing may be performed in an integral multiple.

In an exemplary implementation mode, the subsequent resource allocation unit after the first resource allocation unit may be a combination of unidirectional resource allocation units or a combination of one or more unidirectional resource allocation units and one or more basic resource allocation units.

The unidirectional resource allocation unit is a resource allocation unit only including a single downlink region or a resource allocation unit only including a single uplink region.

The embodiments described above will be described below through two implementation examples.

An implementation example 1 is regarding the transmission of the random access signal and the notification of random access signal resources in a scenario where uplink and downlink regions in a sub-frame are converted flexibly The core problem of a random access is that the diversity of sub-frame formats and the flexible converting of uplink and downlink regions within a sub-frame, which cause a problem that more signaling notifications and calculations are required for obtaining the transmission starting position of the random access signal, and pose a challenge for a terminal to implement the random access. A common feature of these sub-frames or sub-frame combinations is that one continuous uplink region at the tail end of a sub-frame or a sub-frame combination always exists to carry random access signals and the size of the uplink region may change according to the sub-frame type or the combining manner.

Figure 10:
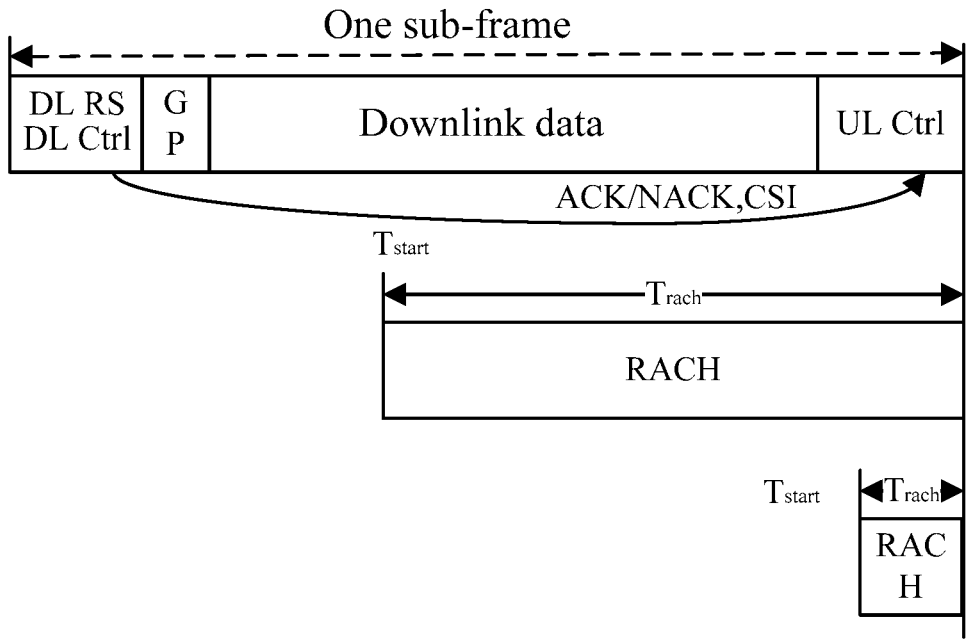
FIG. 10 is a schematic diagram of a method for determining a starting point of a random access signal in an implementation example 1.

To make it easier for the terminal to determine the starting position of the random access signal, a method of finding the starting position reversely may be employed. The tail end of the random access signal of the terminal is determined according to the tail end of the uplink region of a sub-frame or a sub-frame combination. The tail end time point of the uplink region of the sub-frame or sub-frame combination is taken as a reference point, and the transmission starting time point of the random access signals is obtained by subtracting the length of the random access signal from the reference point. As shown in FIG. 10, the starting time point of the random access signal is $T_{start}$ and $T_{start}=T_{end}-T_{rach}$. The length of the random access signal, $T_{rach}$, may have multiple configurations to adapt to different coverage regions. In a normal case, a random access signal is still composed of a cyclic prefix (CP), a preamble, or a guard period (GP). Here, since the starting time point is determined by the length of the random access signal, the total length of the random access signal or the length of each part must be clearly defined in the format configuration.

Compared with the random access in the LTE mentioned in the background, a main difference is that the alignment in the present example with the tail end point while in the LTE, the alignment is with the starting point. In addition to the main difference, in the present example, the related information regarding the internal region of the sub-frame is not needed before the random access signals are transmitted. For example, the related information includes the specific lengths, positions, and resource allocation situations of the downlink region, the uplink region and the guard period. Before transmitting the random access signal, the terminal only needs to know the tail end time point of the uplink region, which is in fact the tail end time point of the sub-frame or sub-frame combination. It is crucial to design a new system. The relevant information regarding the internal region of the sub-frame in the new system is terminal-specific and not public information. Only after the public access process is completed can the terminal read the terminal-specific control channel to obtain the information. However, the random access process is an important step in the public access process and thus it is impossible to acquire the terminal-specific internal region information of the sub-frame before the random access process is performed. In the case that the clear internal region information of the sub-frame cannot be obtained and the random access signals still need to be sent, it is a good solution with high adaptability to determine the transmission starting time point according to the tail end.

Figure 11:
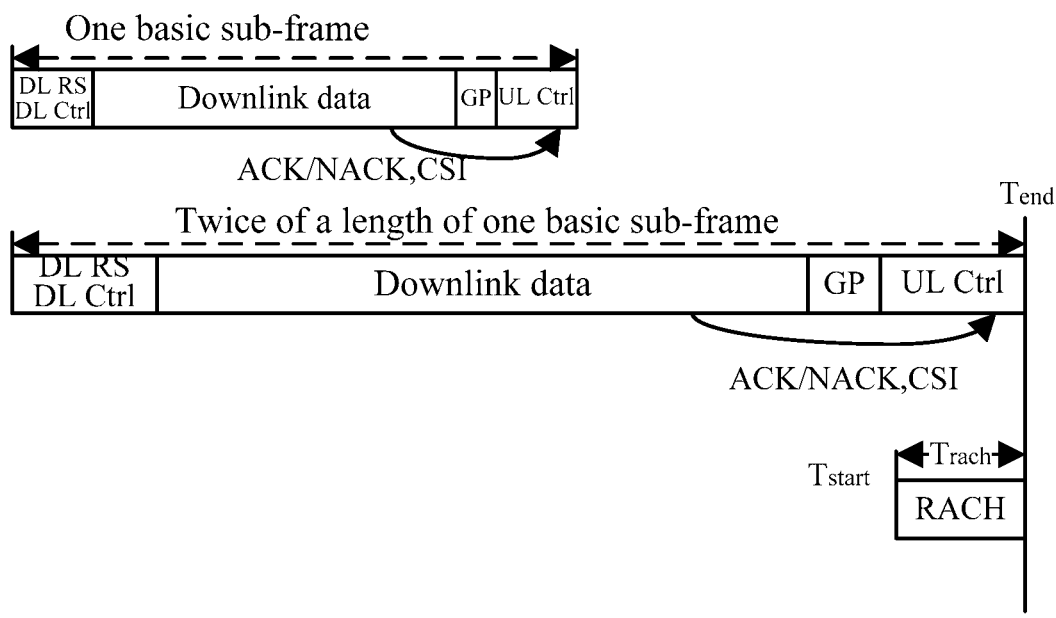
FIG. 11 is a schematic diagram of a method for determining a starting point of a random access signal in an extended sub-frame in the implementation example 1.

When the terminal uses an extended sub-frame, the method for determining the starting position of the random access signals is according to the tail end of the uplink region of the extended sub-frame, as shown in FIG. 11.

Similarly, in the case of a sub-frame combination, the starting time point of the random access signal is still determined according to the tail end of the uplink region. However, the various types of sub-frames for combination and the flexible combination proportions result in that an uplink region is not fixed or periodic in the system, thereby making it difficult to determine suitable random access resources. In this case, different solutions are employed to adapt to different application scenarios. In a universal scenario, uplink sub-frames or uplink regions are configured mandatorily at certain periodic time points. In the region, an uplink random access may be performed. For example, uplink sub-frames are arranged in a proportion of 1/10, that is, an uplink region exists every 10 sub-frame basic units. In a scenario where the ratio of uplink services to downlink services changes slowly, the changing frequency of combination may also be limited to enable combination to change statically or semi-statically, which is convenient for notification by slow signaling such as a higher layer or a broadcast. In a scenario where the ratio of uplink services to downlink services changes rapidly, the number of combination types may be limited. The higher layer of the base station and the terminal both store a combination type list, and the higher layer of the base station and the terminal may acquire the combination type just by transferring a combination type index by physical layer signaling such as a PDCCH, so that the signaling carried by a physical layer is saved and the combination notification manner is also completely dynamic. In this case, the combination manners are obtained in real time and it is equivalent to indirectly notifying the terminal of the information which region may be an uplink region.

Figure 12:
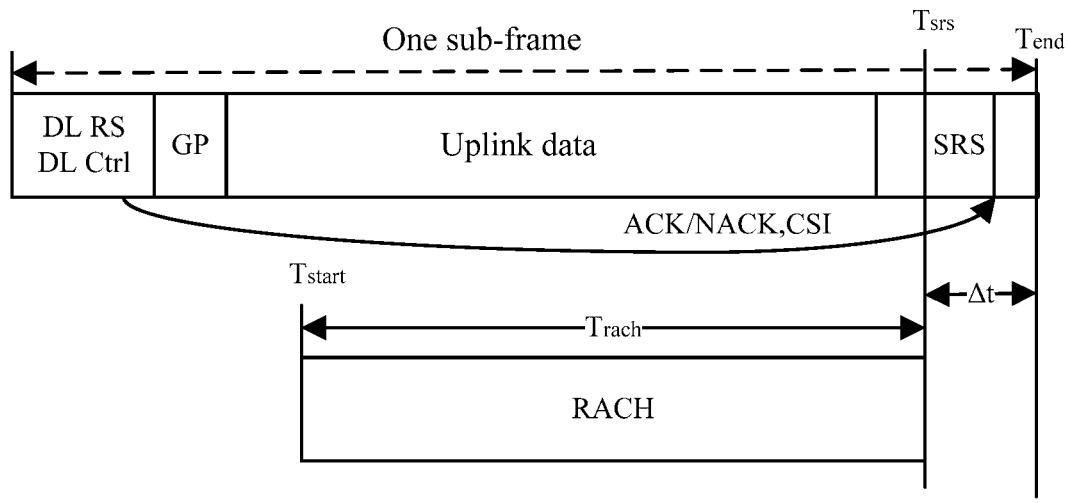
FIG. 12 is a schematic diagram of a method for determining a starting point of a random access signal in the presence of a special signal or symbol in the implementation example 1.

Some special uplink signals in the system will collide with random access signals, and random access signals need to avoid such signals. In this scenario, the tail end of the random access signals needs to be aligned with the starting point of the special uplink signals, and the starting time point of the random access signals is reversely calculated. Alternatively, the tail end of the random access signals is aligned with the position $T_{end}-\Delta t$, where $\Delta t$ is the time difference between the tail end of the uplink region and the starting point of the special uplink signal. As shown in FIG. 12, when SRS, DMRS and other types of special uplink signals or symbols exist in the system, the starting time point of the random access signals is $T_{start}=T_{srs}-T_{rach}=T_{end}-\Delta t-T_{rach}$. $T_{srs}$ is the length of the signal that needs to avoid the random access signal.

Figure 13:
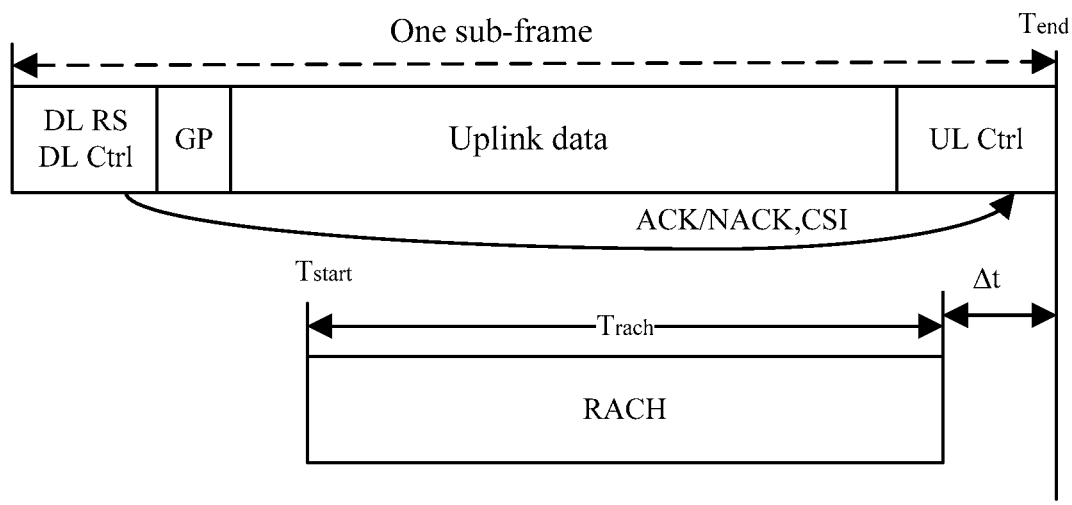
FIG. 13 is a schematic diagram of a method for determining a starting point of a random access signal when $\Delta t$ includes an uplink-downlink conversion time in the implementation example 1.

Considering uplink-downlink conversion time, $\Delta t$ may further include the uplink-downlink conversion time, as shown in FIG. 13, $\Delta t$ is the uplink-downlink conversion time. When the terminal determines the starting time point of the uplink random access, the advance $\Delta t$ may be increased on the original basis. In this case, $T_{start}=T_{end}-\Delta t-T_{rach}$.

Alternatively, as the LTE in the existing art, the entire uplink region transmits the uplink-downlink conversion time in advance so that the uplink-downlink conversion time is no longer separately considered when the advance is determined.

To enable the terminal to successfully find the transmission starting time point of the random access signals, the base station or another network device (for simplicity of description, the base station or another network device is uniformly referred to as the base station) at least needs to notify the terminal of one of the following parameters of the random access resources: (1) At least one of the index of a first sub-frame of the configured random access resources and the length of the configured random access signal. The length information of the random access signal may also be obtained according to the format of the random access signal notified by the base station. The terminal obtains the index of the first sub-frame, calculates the index of the last sub-frame according to the length of the random access signal and performs the alignment with the tail end of the last sub-frame. (2) The index of the last sub-frame of the configured random access resources. If the terminal is notified of the index of the last sub-frame, it is more convenient for the terminal to calculate the transmission starting position of the random access. The terminal is notified of the index of the first sub-frame or the index of the last sub-frame, because continuous random access resources may involve multiple sub-frames to meet the requirements of farther coverage. If the continuous random access resources include only one sub-frame, the index of the first sub-frame is equivalent to the index of the last sub-frame. The parameters of the random access resources may be transmitted through a system broadcast, a system message, or a payload of a downlink access signal, or may be configured in another higher layer signaling.

The base station may also indicate whether the current sub-frame can be used for transmitting the random access signal or further indicate which format of the random access signal the current sub-frame is allowed to transmit in the downlink control signaling region of the current sub-frame. This is a kind of signaling carried by a physical layer. If the terminal tends to transmit the random access signal after the current sub-frame, the base station may also indicate whether a subsequent sub-frame may be used for transmitting the random access signal or further indicate which format of random access signal the subsequent sub-frame is allowed to transmit in the downlink control signaling region of the current sub-frame. The subsequent sub-frame refers to a kth sub-frame after the current sub-frame, where k is greater than or equal to 1. The principle of alignment with the tail end of the random access signal is as described above.

The notification by a base station mentioned above is an explicit notification scheme. Alternatively, a predefined implicit scheme may be used. For example, the random access is initiated in a fixed interval after a certain signal (such as a synchronization signal, a PBCH and an access configuration set signal), and the principle of determining the position of the random access signal according to the tail end is as described above.

Figure 14:
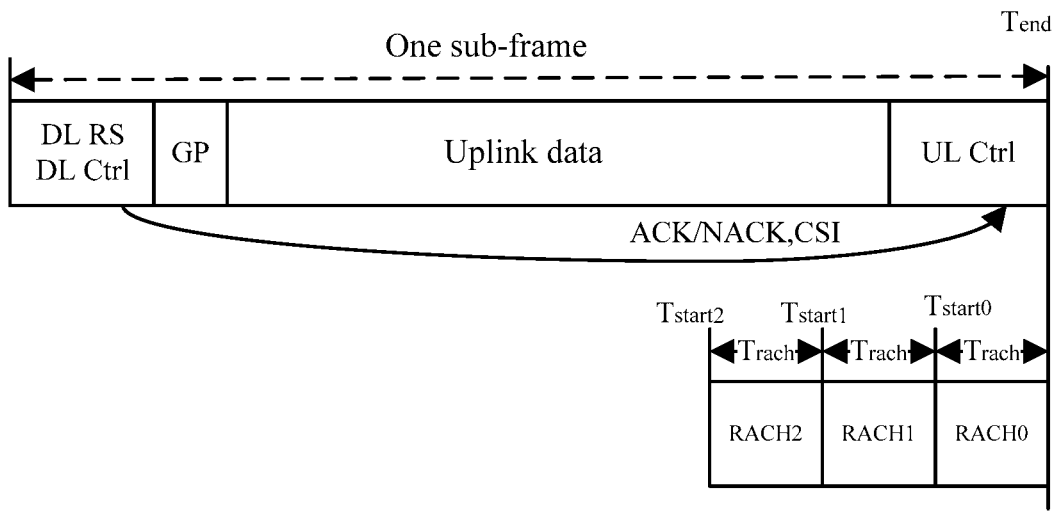
FIG. 14 is a schematic diagram illustrating an correspondence of uplink random access signal resources and indexes in the implementation example 1.

In a non-contention random access process, if a uplink region of a sub-frame is long, the uplink region of the sub-frame may accommodate multiple random access signals and the random access signals are not allowed to collide with each other. As shown in FIG. 14, the base station may number the uplink random access signal resources each with an index, and notify the terminal to transmit signals at uplink random access signal resources corresponding to indicated indexes. The indexes of the resources range from 0 to n, and are in an ascending order. The smaller the index is, the closer the random access signal resource is to the tail end of the uplink region, and the larger the index is, the farther the random access signal resource is from the tail end of the uplink region. The base station may firstly arrange the terminal to transmit signals on the resources with smaller indexes, and then on gradually increased indexes. Each index corresponds to a specific time advance $\Delta t$. For example, the indexes 0 to n correspond to different time advances $\Delta t0$, $\Delta t1$, . . . , and $\Delta tn$. After the indexes are received, the terminal transmits random access signals according to the time advances corresponding to the indexes.

The base station may not notify the terminal of the indexes, but directly notify the terminal of the available time advance $\Delta t$.

An implementation example 2 is regarding the notification of the random access signal resources and of the transmission of the random access signal in a scenario where lengths of uplink and downlink regions in a sub-frame are fixed.

Taking frame structures shown in FIG. 4 to FIG. 6 as examples, if a length of an uplink region, a length of a downlink region and a guard period (GP) in a certain type of sub-frame are always fixed, the random access is simplified and it is easy to obtain the transmission starting time point of the random access signal, and it is unnecessary to calculate based on the tail end of the uplink region. However, a basic sub-frame may not only transmit downlink data but also transmit uplink data, uplink data and downlink data may be converted dynamically, and different types of sub-frames such as the basic sub-frame, an extended sub-frame and a unidirectional sub-frame and combinations thereof may change dynamically or semi-statically, so an obstacle still exists for the terminal to determine a starting position of the random access. To solve this problem, a base station needs to notify the terminal at least one of the following indications: (1) a sub-frame type or an identifier of the sub-frame type, such as a basic sub-frame, an extended sub-frame, a unidirectional sub-frame, or a combination of sub-frames; (2) whether the data segment transmits downlink data or uplink data. Relevant indication signaling may be configured by a higher layer and is suitable for semi-static or quasi-static network device configuration parameters. Relevant indication signaling may also be indicated by a physical layer downlink control signaling of a sub-frame and is suitable for sub-frame parameters which are dynamically changing.

Even in the scenario where the length of uplink and downlink regions in the sub-frame are fixed, it is still necessary for the base station to indicate whether the current sub-frame may be used for transmitting the random access signal or further indicate which format of the random access signal the current sub-frame is allowed to transmit in the downlink control signaling region of the current sub-frame. This is a kind of signaling carried by a physical layer. If the terminal tends to transmit the random access signals after the current sub-frame, the base station may also indicate whether a subsequent sub-frame can be used for transmitting the random access signal or further indicate which format of random access signal the subsequent sub-frame is allowed to transmit in the downlink control signaling region of the current sub-frame. The subsequent sub-frame refers to a kth sub-frame after the current sub-frame, where k is greater than or equal to 1.

Figure 15:
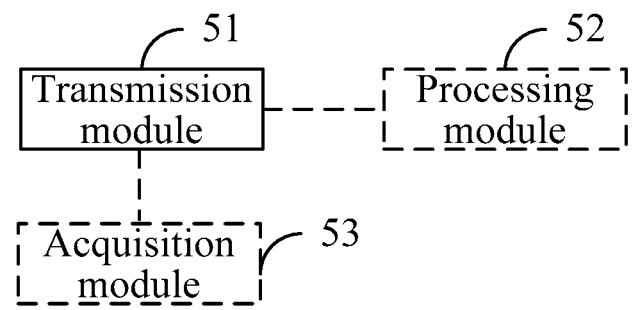
FIG. 15 is a block diagram of a signal transmitting apparatus according to an embodiment 5.

Embodiment 5 provides a signal transmitting apparatus, which is disposed in a terminal. As shown in FIG. 15, the apparatus includes the module described below.

A transmission module 51 is configured to transmit one or more random access signals. A tail end of the one or more random access signals is aligned with a position t−Δt of a signal transmission region in transmission resource of the one or more random access signals, where t is a tail end time point of the signal transmission region and Δt is an advance. Alternatively, a transmission starting time point of the one or more random access signals is a result obtained by subtracting a length of the one or more random access signals and the advance from the tail end time point of the signal transmission region in the transmission resources.

The transmission resources may include one or more of the following resource allocation units: a basic resource allocation unit, a stretched resource allocation unit, a compressed resource allocation unit and a unidirectional resource allocation unit.

In an exemplary implementation of the present embodiment, the advance may be greater than or equal to 0.

In this exemplary implementation, the advance may be determined according to a signal that needs to avoid the random access signals. For example, the advance includes a time difference between a starting time point of an uplink signal that needs to avoid the random access signals and a tail end time point of an uplink region. The uplink signal that needs to avoid the random access signals may include, but is not limited to, at least one of a sounding reference signal (SRS), a de modulation reference signal (DMRS) and the like.

In an exemplary implementation of the present embodiment, when the resource allocation unit is an extended resource allocation unit, the tail end of the signal transmission region is a tail end of the signal transmission region of the extended resource allocation unit.

In this exemplary implementation, the extended resource allocation unit may be a resource allocation unit formed by stretching or compressing a basic resource allocation unit. The stretching or compressing may include stretching or compressing one or more of an uplink control region, a downlink control region, a data portion and a guard period of the basic resource allocation unit. For example, only the total length of the basic resource allocation unit is stretched or compressed, but the lengths of the control region and the guard period remain unchanged.

The stretching or compressing may be performed in an integral multiple.

In an exemplary implementation of the present embodiment, the transmission resources may be a combination of unidirectional resource allocation units or a combination of one or more unidirectional resource allocation units and one or more basic resource allocation units.

In this exemplary implementation, the unidirectional resource allocation unit may be a resource allocation unit only including a downlink region or a resource allocation unit only including an uplink region.

In an exemplary implementation of the present embodiment, the resource allocation unit includes a basic resource allocation unit. The portion other than uplink and downlink control regions not only can transmit uplink data but also can transmit downlink data.

In an exemplary implementation of the present embodiment, the multiple random access signals may be carried in different regions of the transmission resources, and the different regions do not overlap.

In this implementation, the signal transmitting apparatus according to the present embodiment further includes a processing module 52, which configured to determine the regions where the multiple random access signals are carried according to indexes indicated by a base station.

The relationship between indexes and random access signal resources may be the following relationship: the smaller the index of the region is, the closer the region where the random access signal is carried is to the tail end of the signal transmission region; the larger the index of the region is, the farther the region where the random access signal is carried is from the tail end of the signal transmission region.

In an exemplary implementation of the present embodiment, the transmission resources may be a basic scheduling unit (BSU).

In an exemplary implementation of the present embodiment, the signal transmitting apparatus further includes an acquisition module 53. The transmission module 51 is configured to transmit the random access signal before the acquisition module 53 acquires at least one of relevant information regarding an internal region of the transmission resources and relevant configuration information regarding uplink and downlink resources.

In this exemplary implementation, the relevant information to the internal region of the transmission resources may include one or more of the following:

a parameter of a downlink region, a parameter of an uplink region, a parameter of a guard period and a transmission direction of a data region. The parameter may include one or more of a length, a position or a resource allocation situation.

Figure 16:
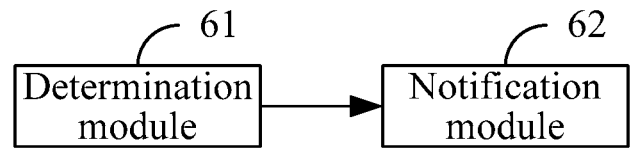
FIG. 16 is a block diagram of a resource notification apparatus according to an embodiment 6.

Embodiment 6 provides a resource notification apparatus, which is disposed in a base station. As shown in FIG. 16, the apparatus includes the modules described below.

A determination module 61 is configured to determine one or more of the following parameters of the random access resources: identifiers of transmission resources for configuring the random access resources, a length of a random access signal, time advances Δt and indexes of the random access resources.

A notification module 62 is configured to notify a terminal of the determined parameters of the random access resources.

The transmission resources may include one or more of the following resource allocation units: a basic resource allocation unit, a stretched resource allocation unit, a compressed resource allocation unit and a unidirectional resource allocation unit.

In an exemplary implementation of the present embodiment, if the configured consecutive random access resources exceed one resource allocation unit, the parameters of the random access resources determined by the determining module 61 may at least include an identifier of the first resource allocation unit or an identifier of the last resource allocation unit in the configured consecutive random access resources.

In an exemplary implementation of the present embodiment, the smaller the index or the time advance $\Delta t$ is, the closer the random access signal resource is to the tail end of the signal transmission region in the transmission resources; the larger the index or the time advance $\Delta t$ is, the farther the random access signal resource is from the tail end of the signal transmission region in the transmission resources.

In this exemplary implementation, the determination module 61 is configured to determine one or more parameters of the random access resources in the following manner.

When the parameters of the random access resources include at least one of the time advance $\Delta t$ and the index, at least one of values of the time advances $\Delta t$ and values of the indexes is determined in an ascending order.

In an exemplary implementation of the present embodiment, the notification module 62 is configured to notify the terminal of the determined parameters of the random access resources in the following manner.

The determined parameters of the random access resources are sent to the terminal through a system broadcast, a system message, or a payload of a downlink access signal, or may be configured in another higher layer signaling.

In an exemplary implementation of the present embodiment, the time advance $\Delta t$ may be used for avoiding an uplink signal that needs to avoid the random access signal or distinguishing between different random access resource regions.

Figure 17:
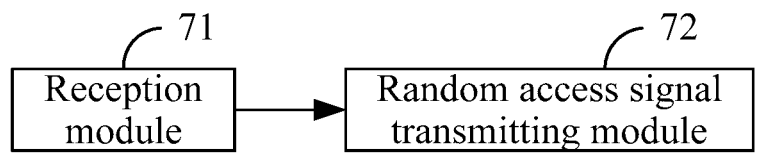
FIG. 17 is a block diagram of a signal transmitting apparatus according to an embodiment 7.

Embodiment 7 provides a signal transmitting apparatus, which is disposed in a terminal. As shown in FIG. 17, the apparatus includes the modules described below.

A reception module 71 is configured to receive a predetermined signal.

A random access signal transmitting module 72 is configured to transmit a random access signal after a predetermined length of time from when the reception module 71 receives the predetermined signal.

In an exemplary implementation of the present embodiment, the predetermined signal may include one or more of a synchronization signal, a physical broadcast channel (PBCH) and an access configuration set signal.

Figure 18:
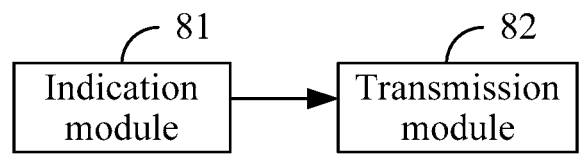
FIG. 18 is a block diagram of a resource notification apparatus according to an embodiment 8.

Embodiment 8 provides a resource notification apparatus, which is disposed in a base station. As shown in FIG. 18, the apparatus includes the modules described below.

An indication module 81 is configured to indicate, in a downlink control signaling region of a first resource allocation unit, whether the first resource allocation unit or a subsequent resource allocation unit is available for transmitting a random access signal; or indicate, in the downlink control signaling region of the first resource allocation unit, a format of the random access signal that the first resource allocation unit or the subsequent resource allocation unit is allowed to transmit.

A transmission module 82 is configured to transmit the first resource allocation unit.

In an exemplary implementation of the present embodiment, the subsequent resource allocation unit after the first resource allocation unit refers to a kth resource allocation unit after the first resource allocation unit, where k is greater than or equal to 1.

In this exemplary implementation, the subsequent resource allocation unit after the first resource allocation unit may include one or more of the following resource allocation units: a basic resource allocation unit, a stretched resource allocation unit, a compressed resource allocation unit and a unidirectional resource allocation unit.

The stretched resource allocation unit is formed by stretching the basic resource allocation unit and the compressed resource allocation unit is formed by compressing the basic resource allocation unit. The stretching or compressing may include stretching or compressing one or more of an uplink control region, a downlink control region, a data portion and a guard period of the basic resource allocation unit. For example, only the total length of the basic resource allocation unit is stretched or compressed, but the lengths of the control region and the guard period remain unchanged.

In an exemplary implementation mode, the stretching or compressing may be performed in an integral multiple.

In an exemplary implementation mode, the transmission resources may be a combination of unidirectional resource allocation units or a combination of one or more unidirectional resource allocation units and one or more basic resource allocation units. The unidirectional resource allocation unit may be a resource allocation unit only including an uplink region or a resource allocation unit only including a downlink region.

Embodiment 9 provides a frame structure for transmitting a random access signal. The frame structure includes a signal transmission region. A tail end of the random access signal is aligned with a position $t-\Delta t$ of the signal transmission region, where t is a tail end time point of the signal transmission region and $\Delta t$ is an advance. Alternatively, a starting position of the one or more random access signals in the frame structure is a result obtained by subtracting a length of the one or more random access signals and the advance from the tail end time point of the signal transmission region.

The frame structure may be a frame structure of a sub-frame or a sub-frame combination. The sub-frame may be an extended sub-frame or a basic sub-frame. When the sub-frame is a basic sub-frame, except uplink and downlink control regions, remaining portions of the frame structure not only can serve as an uplink data region but also can serve as a downlink data region. The sub-frame combination may be a combination of unidirectional sub-frames or a combination of one or more unidirectional sub-frames and one or more basic sub-frames.

The sub-frame or sub-frame combination may be, but not limited to, a basic scheduling unit (BSU).

In an exemplary implementation mode, the advance $\Delta t$ may be greater than or equal to 0.

For other details, references may be made to embodiment 1, embodiment 2, embodiment 5 and embodiment 6 and implementation examples.

Embodiment 10 provides a wireless communication method. The method includes: transmitting or receiving a signal on wireless resources, where the wireless resources are formed by stretching or compressing a basic resource allocation unit.

The stretching or compressing may include stretching or compressing one or more of an uplink control region, a downlink control region, a data portion and a guard period of the basic resource allocation unit.

The stretching or compressing may be performed in an integral multiple.

Embodiment 11 provides a wireless communication method. The method includes: transmitting or receiving a signal on wireless resources. The wireless resources are a combination of unidirectional resource allocation units or a combination of one or more unidirectional resource allocation units and one or more basic resource allocation units.

The unidirectional resource allocation unit may be a resource allocation unit only including an uplink region or a resource allocation unit only including a downlink region.

Embodiment 12 provides a wireless communication apparatus. The apparatus includes a transmission module.

The transmission module is configured to transmit or receive a signal on wireless resources. The wireless resources are formed by stretching or compressing a basic resource allocation unit. Alternatively, the wireless resources are a combination of unidirectional resource allocation units or a combination of one or more unidirectional resource allocation units and one or more basic resource allocation units.

The stretching or compressing may include stretching or compressing one or more of an uplink control region, a downlink control region, a data portion and a guard period of the basic resource allocation unit.

The stretching or compressing may be performed in an integral multiple.

The unidirectional resource allocation unit may be a resource allocation unit only including an uplink region or a resource allocation unit only including a downlink region.

For other details of embodiments 10-12, references may be made to embodiment 1 and implementation examples, which will not be repeated here.

In addition, embodiments of the present disclosure further provide a computer-readable storage medium configured to store computer-executable instructions that, when being executed by a processor, implement the resource notification method or wireless communication method when executed.

It will be understood by those skilled in the art that functional modules/units in all or part of the steps of the method, the system, and the device disclosed above may be implemented in software, firmware, hardware, and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microprocessors, hardware, or integrated circuits such as application specific integrated circuits. Such software may be distributed on computer-readable medium, which may include computer storage media (non-transitory medium) and communication media (transitory medium). As is known to those skilled in the art, the term, computer storage medium, includes volatile and nonvolatile, removable and non-removable medium implemented in any method or technology for storing information (such as computer-readable instructions, data structures, program modules or other data). The computer storage media include, but are not limited to, RAM, ROM, EEPROM, flash memory or other memory technologies, CD-ROM, digital versatile disc (DVD), or other optical disc storage, magnetic cassette, magnetic tape, magnetic disk storage or other magnetic storage devices, or any other media used for storing desired information and accessible by the computer. In addition, as is known to those skilled in the art, communication media generally include computer-readable instructions, data structures, program modules, or data in modulated data signals such as carriers or other transmission mechanisms, and may include any information delivery media.

Although the embodiments disclosed by the present application are as described above, the content thereof is merely embodiments for facilitating the understanding of the present application and is not intended to limit the present application. Any person skilled in the art to which the present application pertains may make any modifications and changes in the forms and details of the implementation without departing from the spirit and scope disclosed by the present application, but the patent protection scope of the present application is still subject to the scope defined by the appended claims.

INDUSTRIAL APPLICABILITY

The random access solution and the resource notification solution according to the embodiments of the present application may ensure a smooth random access, save system overhead and decrease implementation complexity.

What is claimed is:

1. A method for wireless communication, comprising:
   receiving, by a terminal, a system message from a base station, wherein the system message includes a parameter for configuring transmission resources of a random access process;
   determining, by the terminal, a time-domain position of a plurality of random access preambles based on the system message, wherein the plurality of random access preambles is carried in a transmission region in the transmission resources that are configured according to the parameter,
   wherein the time-domain position is determined such that a time-domain tail end of the plurality of random access preambles is aligned with a t-Δt position of the transmission region, and wherein t is a tail end time point of the transmission region and Δt is an advance that is greater than or equal to 0; and
   transmitting, by the terminal, the plurality of random access preambles to the base station according to the determined time-domain position.

2. The method of claim 1, wherein the plurality of random access preambles is carried in different regions of the transmission resources, and the different regions do not overlap with each other.

3. The method of claim 1, wherein the parameter indicates identifiers of the transmission resources and a length of a random access preamble of the plurality of random access preambles.

4. A method for wireless communication, comprising:
   transmitting, by a base station, a system message to a terminal, wherein the system message includes a parameter for configuring transmission resources for a random access process; and
   receiving, by the base station, a plurality of random access preambles from the terminal, wherein the plurality of random access preambles is carried in a transmission region in the transmission resources that are configured according to the parameter, wherein a time-domain position of the plurality of random access preambles is determined such that a time-domain tail end of the plurality of random access preambles is aligned with a t-Δt position of the transmission region, and wherein t is a tail end time point of the transmission region and Δt is an advance that is greater than or equal to 0.

5. The method of claim 4, wherein the parameter indicates identifiers of the transmission resources and a length of a random access preamble of the plurality of random access preambles.

6. The method of claim 4, wherein the plurality of random access preambles is carried in different regions of transmission resources, wherein the different regions do not overlap with each other.

7. A device for wireless communication, comprising:
a processor, and
a memory including processor executable code, wherein the processor executable code upon execution by the processor configures the processor to:
receive a system message from a base station, the system message including a parameter for configuring transmission resources for a random access process;
determine a time-domain position of a plurality of random access preambles based on the system message, wherein the plurality of random access preambles is carried in a transmission region in the transmission resources that are configured according to the parameter, wherein the time-domain position is determined such that a time-domain tail end of the plurality of random access preambles is aligned with a t-$\Delta$t position of the transmission region, and wherein t is a tail end time point of the transmission region and $\Delta$t is an advance that is greater than or equal to 0; and
transmit the plurality of random access preambles to the base station according to the determined time-domain position.

8. The device of claim 7, wherein the parameter indicates identifiers of the transmission resources and a length of a random access preamble of the plurality of random access preambles.

9. The device of claim 7, wherein the plurality of random access preambles is carried in different regions of transmission resources, wherein the different regions do not overlap with each other.

10. A device for wireless communication, comprising:
a processor, and
a memory including processor executable code, wherein the processor executable code upon execution by the processor configures the processor to:
transmit a system message to a terminal, the system message including a parameter for configuring transmission resources for a random access process; and
receive a plurality of random access preambles from the terminal, wherein the plurality of random access preambles is carried in a transmission region in the transmission resources that are configured according to the parameter, wherein a time-domain position of the plurality of random access preambles is determined such that a time-domain tail end of the plurality of random access preambles is aligned with a t-$\Delta$t position of the transmission region, and wherein t is a tail end time point of the transmission region and $\Delta$t is an advance that is greater than or equal to 0.

11. The device of claim 10, wherein the parameter indicates identifiers of the transmission resources and a length of a random access preamble of the plurality of random access preambles.

12. The device of claim 10, wherein the plurality of random access preambles is carried in different regions of transmission resources, wherein the different regions do not overlap with each other.

13. A non-transitory storage medium having code stored thereon, the code upon execution by a processor, causing the processor to implement a method that comprises:
receiving, by a terminal, a system message from a base station, wherein the system message includes a parameter for configuring transmission resources of a random access process;
determining, by the terminal, a time-domain position of a plurality of random access preambles based on the system message, wherein the plurality of random access preambles is carried in a transmission region in the transmission resources that are configured according to the parameter, wherein the time-domain position is determined such that a time-domain tail end of the plurality of random access preambles is aligned with a t-$\Delta$t position of the transmission region, and wherein t is a tail end time point of the transmission region and $\Delta$t is an advance that is greater than or equal to 0; and
transmitting, by the terminal, the plurality of random access preambles to the base station according to the determined time-domain position.

14. The non-transitory storage medium of claim 13, wherein the parameter indicates identifiers of the transmission resources and a length of a random access preamble of the plurality of random access preambles.

15. The non-transitory storage medium of claim 13, wherein the plurality of random access preambles is carried in different regions of transmission resources, wherein the different regions do not overlap with each other.

16. A non-transitory storage medium having code stored thereon, the code upon execution by a processor, causing the processor to implement a method that comprises:
transmitting, by a base station, a system message to a terminal, wherein the system message includes a parameter for configuring transmission resources for a random access process; and
receiving, by the base station, a plurality of random access preambles from the terminal, wherein the plurality of random access preambles is carried in a transmission region in the transmission resources that are configured according to the parameter, wherein a time-domain position of the plurality of random access preambles is determined such that a time-domain tail end of the plurality of random access preambles is aligned with a t-$\Delta$t position of the transmission region, and wherein t is a tail end time point of the transmission region and $\Delta$t is an advance that is greater than or equal to 0.

17. The non-transitory storage medium of claim 16, wherein the parameter indicates identifiers of the transmission resources and a length of a random access preamble of the plurality of random access preambles.

18. The non-transitory storage medium of claim 16, wherein the plurality of random access preambles is carried in different regions of transmission resources, wherein the different regions do not overlap with each other.

\* \* \* \* \*